(12) United States Patent
Kato et al.

(10) Patent No.: US 9,464,699 B2
(45) Date of Patent: Oct. 11, 2016

(54) CHAIN GUIDE AND CHAIN TRANSMISSION DEVICE

(71) Applicants: Akio Kato, Shizuoka (JP); Shinji Oishi, Shizuoka (JP); Goro Nakao, Shizuoka (JP)

(72) Inventors: Akio Kato, Shizuoka (JP); Shinji Oishi, Shizuoka (JP); Goro Nakao, Shizuoka (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 14/381,017

(22) PCT Filed: Feb. 25, 2013

(86) PCT No.: PCT/JP2013/054708
§ 371 (c)(1),
(2) Date: Aug. 26, 2014

(87) PCT Pub. No.: WO2013/136956
PCT Pub. Date: Sep. 19, 2013

(65) Prior Publication Data
US 2015/0018149 A1     Jan. 15, 2015

(30) Foreign Application Priority Data

Mar. 12, 2012   (JP) ................................. 2012-054310
Jun. 7, 2012   (JP) ................................. 2012-129753
Jun. 20, 2012   (JP) ................................. 2012-138601

(51) Int. Cl.
*F16H 7/12*        (2006.01)
*F16H 7/20*        (2006.01)
(Continued)

(52) U.S. Cl.
CPC ............... *F16H 7/20* (2013.01); *F16C 13/006* (2013.01); *F16C 33/545* (2013.01);
(Continued)

(58) Field of Classification Search
CPC ............... F16H 2007/0874; F16H 2007/0865; F16H 7/1281; B65G 39/12; B65G 13/11
USPC .......................................... 474/111, 134, 135
See application file for complete search history.

(56) References Cited

U.S. PATENT DOCUMENTS 68,625 A *   9/1867   Hawley .......................... 474/137
993,684 A *   5/1911   Vom Hoff ............. F16H 7/1281
                                                              474/131

(Continued)

FOREIGN PATENT DOCUMENTS

JP       63-166513       10/1988
JP       03-060944       3/1991

(Continued)

OTHER PUBLICATIONS

Extended European Search Report issued May 28, 2015 in corresponding European Application No. 13760726.3.

(Continued)

*Primary Examiner* — Henry Liu
(74) *Attorney, Agent, or Firm* — Wenderoth, Lind & Ponack, L.L.P.

(57) ABSTRACT

A chain guide includes a guide base (21) disposed to face one side of a timing chain (5) that transmits torque, the chain guide having an opposed pair of side plates (22) each formed with a plurality of shaft engaging portions (25) arranged along a circular arc. Roller shafts (31) have their ends supported by the respective shaft engaging portions (25). Rollers (41) for guiding the chain are rotatably supported by the respective roller shafts (31). Noncylidrical surface engaging portions are formed on the ends of the roller shafts (31) and on closed ends of the shaft engaging portions (50) to rotationally fix the roller shafts (31), thereby preventing the roller shafts (31) from rotating under drag torque applied from the rollers (41).

14 Claims, 12 Drawing Sheets

(51) Int. Cl.
*F16C 33/58* (2006.01)
*F16C 35/06* (2006.01)
*F16H 7/06* (2006.01)
*F16C 13/00* (2006.01)
*F16C 33/54* (2006.01)
*F16H 7/08* (2006.01)
*F16C 19/46* (2006.01)

(52) U.S. Cl.
CPC .......... *F16C 33/586* (2013.01); *F16C 33/588* (2013.01); *F16C 35/06* (2013.01); *F16H 7/06* (2013.01); *F16C 19/466* (2013.01); *F16C 2202/04* (2013.01); *F16C 2226/36* (2013.01); *F16C 2361/63* (2013.01); *F16H 7/1281* (2013.01); *F16H 2007/0865* (2013.01); *F16H 2007/0893* (2013.01)

(56) References Cited

U.S. PATENT DOCUMENTS

| | | | | |
|---|---|---|---|---|
| 1,338,293 A | * | 4/1920 | Fuchs | F16H 7/1254 474/134 |
| 1,480,078 A | * | 1/1924 | Kegresse | B62D 55/108 180/9.62 |
| 1,499,920 A | * | 7/1924 | Godden | B65G 13/11 193/37 |
| 1,579,245 A | * | 4/1926 | Pennington | B62D 55/108 305/134 |
| 2,158,865 A | * | 5/1939 | Sammon | F27D 3/028 193/35 R |
| 2,341,273 A | * | 2/1944 | Helberg | B64C 13/30 474/109 |
| 2,349,281 A | * | 5/1944 | Kendall | F16H 7/20 29/898.057 |
| 2,709,371 A | * | 5/1955 | Hale | D05B 59/00 112/279 |
| 2,729,110 A | * | 1/1956 | Killian | F16H 55/171 474/153 |
| 2,827,153 A | * | 3/1958 | Olk | B65G 13/071 193/35 R |
| 2,892,206 A | * | 6/1959 | Deibel | B60S 1/20 15/250.25 |
| 2,964,155 A | * | 12/1960 | Flowers | B65G 13/11 193/35 R |
| 3,267,758 A | * | 8/1966 | Poundstone | B65G 39/02 474/197 |
| 3,586,142 A | * | 6/1971 | Inwood | B65G 1/023 193/35 R |
| 3,598,194 A | * | 8/1971 | Wappler | B60K 17/36 180/6.2 |
| 3,888,217 A | * | 6/1975 | Hisserich | F01L 1/024 123/90.15 |
| 3,930,323 A | * | 1/1976 | Marold | E02F 3/6454 198/813 |
| 3,950,046 A | * | 4/1976 | Lubbersmeyer | F16C 13/006 384/546 |
| 3,951,484 A | * | 4/1976 | Bowman, Jr. | B65G 21/16 104/172.2 |
| 4,054,195 A | * | 10/1977 | Wahl | B65G 13/11 193/35 R |
| 4,068,535 A | * | 1/1978 | Sheets | F16H 7/1254 474/132 |
| 4,078,642 A | * | 3/1978 | Payne | B65G 39/09 193/37 |
| 4,208,078 A | * | 6/1980 | Miki | F16C 33/467 29/898.061 |
| 4,213,523 A | * | 7/1980 | Frost | B65G 39/09 193/37 |
| 4,311,226 A | * | 1/1982 | Thompson | B65G 39/02 193/35 R |
| 4,416,647 A | * | 11/1983 | White, Jr. | F16H 7/1281 474/134 |
| 4,416,648 A | * | 11/1983 | Radocaj | F16H 7/1272 474/135 |
| 4,474,562 A | * | 10/1984 | Heurich | F16H 7/1281 29/517 |
| 4,610,646 A | * | 9/1986 | Walter | F16C 13/006 474/174 |
| 4,626,231 A | * | 12/1986 | Nagano | F16D 1/076 29/465 |
| 4,723,516 A | * | 2/1988 | Slagley | F01L 1/348 123/90.16 |
| 4,767,387 A | * | 8/1988 | Matsuoka | B21D 53/261 474/168 |
| 4,892,508 A | * | 1/1990 | Ryan | B61B 12/06 105/151 |
| 4,908,006 A | * | 3/1990 | Burysek | D01H 1/241 474/117 |
| 4,913,689 A | * | 4/1990 | Morishita | B21H 1/04 474/170 |
| 4,969,548 A | * | 11/1990 | Kornylak | F16C 13/006 193/35 R |
| 4,981,116 A | * | 1/1991 | Trinquard | F02B 67/06 123/90.31 |
| 5,033,921 A | | 7/1991 | Yasuhara et al. | |
| 5,242,047 A | * | 9/1993 | Bonnet | B65G 39/12 198/842 |
| 5,244,439 A | * | 9/1993 | Rogus | F16H 7/1263 474/136 |
| 5,441,354 A | * | 8/1995 | Broder | B41J 29/02 226/181 |
| 5,441,458 A | * | 8/1995 | Rogus | F16H 7/1245 198/826 |
| 5,848,846 A | * | 12/1998 | Sugiyama | F16C 19/466 29/898.061 |
| 5,961,411 A | * | 10/1999 | Tsutsumi | F16H 7/18 474/111 |
| 5,967,925 A | * | 10/1999 | Meckstroth | F16H 55/38 474/168 |
| 6,041,490 A | * | 3/2000 | Tabuchi | B21H 1/04 29/602.1 |
| 6,062,998 A | * | 5/2000 | Kumakura | F16H 7/18 474/110 |
| 6,112,875 A | * | 9/2000 | Gibson | B65G 13/00 193/35 R |
| 6,161,681 A | * | 12/2000 | Kalm | B65G 39/12 198/781.1 |
| 6,179,740 B1 | * | 1/2001 | Walker | F16H 7/1254 474/134 |
| 6,189,639 B1 | * | 2/2001 | Fuse | B62M 9/00 180/231 |
| 6,196,375 B1 | * | 3/2001 | Cozza | B65G 21/2054 193/35 C |
| 6,220,211 B1 | * | 4/2001 | Line | F01L 1/348 123/90.15 |
| 6,244,428 B1 | * | 6/2001 | Atkins | B65G 39/12 198/823 |
| 6,245,436 B1 | * | 6/2001 | Boyle | C25D 11/026 428/472.2 |
| 6,254,503 B1 | * | 7/2001 | Chiba | F16H 55/56 29/894 |
| 6,346,057 B1 | * | 2/2002 | Edelmann | B65G 15/02 474/110 |
| 6,367,617 B1 | * | 4/2002 | Schiesser | B65G 39/12 198/370.04 |
| 6,481,564 B2 | * | 11/2002 | Kalm | B65G 39/12 193/35 R |
| 6,523,664 B2 | * | 2/2003 | Shaw | B65G 1/023 193/35 R |
| 6,799,676 B1 | * | 10/2004 | Shipmon | B65G 39/12 193/35 R |
| 7,104,909 B2 | * | 9/2006 | Asbeck | F16H 7/1218 474/112 |
| 7,419,447 B2 | * | 9/2008 | Serkh | F16H 7/1218 474/117 |
| 7,780,556 B2 | * | 8/2010 | Sakanaka | F16G 5/16 474/174 |
| 7,866,292 B2 | * | 1/2011 | LaBere | F01L 1/02 123/90.15 |
| 7,909,717 B2 | * | 3/2011 | Boussaguet | F16C 13/006 474/136 |
| 8,282,289 B2 | * | 10/2012 | Oishi | F16C 33/541 384/564 |

(56) References Cited

U.S. PATENT DOCUMENTS

| | | | |
|---|---|---|---|
| 8,684,895 B2* | 4/2014 | Severing | C21D 5/00 492/1 |
| 2001/0053727 A1* | 12/2001 | Nakashima | F16G 5/16 474/242 |
| 2003/0092521 A1* | 5/2003 | Konno | F16H 7/18 474/111 |
| 2004/0002401 A1* | 1/2004 | Iverson | F16H 7/1254 474/134 |
| 2004/0116224 A1* | 6/2004 | Sakamoto | F16H 55/30 474/152 |
| 2005/0031240 A1* | 2/2005 | Dodoro | F16C 19/163 384/494 |
| 2006/0153485 A1* | 7/2006 | Maeda | F16C 19/30 384/569 |
| 2007/0026986 A1* | 2/2007 | Walker | F16H 7/1254 474/134 |
| 2007/0110348 A1* | 5/2007 | Obara | F16C 17/026 384/107 |
| 2008/0070731 A1* | 3/2008 | Vrsek | F01L 1/348 474/134 |
| 2010/0160102 A1* | 6/2010 | Haag et al. | C23C 22/53 474/166 |
| 2011/0294612 A1* | 12/2011 | Kato | F16H 7/08 474/91 |
| 2013/0324339 A1* | 12/2013 | Kato | F16H 7/18 474/137 |
| 2013/0331211 A1* | 12/2013 | Kato | F16H 7/18 474/101 |

FOREIGN PATENT DOCUMENTS

| | | |
|---|---|---|
| JP | 04-097709 | 8/1992 |
| JP | 07-052694 | 2/1995 |
| JP | 10-046318 | 2/1998 |
| JP | 2002-356212 | 12/2002 |
| JP | 2004-091060 | 3/2004 |
| JP | 2005-249112 | 9/2005 |
| JP | 2007-085446 | 4/2007 |
| JP | 2009-236231 | 10/2009 |
| JP | 2009-264534 | 11/2009 |
| JP | 2011-047473 | 3/2011 |
| JP | 2011-058551 | 3/2011 |
| JP | 2011-058552 | 3/2011 |
| JP | 2011-089553 | 5/2011 |
| WO | 2010/090139 | 8/2010 |

OTHER PUBLICATIONS

International Search Report issued May 21, 2013 in International (PCT) Application No. PCT/JP2013/054708.

Written Opinion of the International Searching Authority issued May 21, 2013 in International (PCT) Application No. PCT/JP2013/054708 (with English translation).

Japanese Office Action issued Nov. 10, 2015 in corresponding Japanese Application No. 2012-054310 (with English translation).

* cited by examiner

CHAIN GUIDE AND CHAIN TRANSMISSION DEVICE

TECHNICAL FIELD

This invention relates to a chain guide used to adjust the tension of a chain, or to guide the movement of the chain, and a chain transmission device including such a chain guide.

BACKGROUND ART

A chain transmission device includes a timing chain trained around a driving sprocket mounted to a crankshaft and a driven sprocket mounted to a camshaft and adapted to drive the camshaft. Such a chain transmission device further includes a pivotable chain guide provided on one side of the slack side of the timing chain, and a chain tensioner adapted to apply an adjusting force to the end of the chain guide remote from the end about which the chain guide pivots, thereby minimizing slackening and flapping of the timing chain by tensioning the chain.

Such a chain transmission device further includes a stationary chain guide fixedly mounted to extend along the tension side of the timing chain to guide the movement of the timing chain, thereby further reducing flapping of the chain.

Such known chain guides, which are used to adjust the tension of the timing chain or guide the movement of the timing chain, include those of the type that guide the timing chain by being in surface-to-surface sliding contact with the timing chain. This type of chain guide, however, has a problem in that a large moving resistance is applied to the timing chain, thus increasing loss of torque to be transmitted.

In order to avoid this problem, the below-identified Patent document 1 proposes a chain guide which includes a guide base elongated in the moving direction of the timing chain, a plurality of roller shafts arranged along a curved line and having both ends thereof supported by the guide base, and rollers comprising roller bearings rotatably mounted on the respective roller shafts such that the timing chain is movably guided by the rollers.

In this chain guide, since the timing chain is guided by the rollers with the rollers in rolling contact with the timing chain, the moving resistance applied to the timing chain is small, and so is the loss of torque to be transmitted.

PRIOR ART DOCUMENT(S)

Patent Document(s)

Patent document 1: International Publication 2010/090139A

SUMMARY OF THE INVENTION

Object of the Invention

In the chain guide disclosed in Patent document 1, if the roller shafts are rotatably supported, due to drag torque applied from the rollers while the rollers are rotating, the roller shafts tend to rotate. Due to rotation of the roller shafts, the ends of the roller shafts and the portions supporting the ends of the roller shafts tend to become worn.

In order to avoid wear of the above portions, Patent document 1 proposes to form shaft inserting recesses in an opposed pair of side plates forming the guide base. Each shaft inserting recess has a circular arc-shaped portion having an inner diameter smaller than the outer diameters of the roller shafts at their respective ends. The roller shafts are rotationally fixed in position by being fitted at their ends in the respective shaft inserting recesses due to interference fit between the radially inner surfaces of the circular arc-shaped portions and the radially outer surfaces of the ends of the roller shafts, which are made of steel. In order to allow interference fitting, the entire guide base is formed from resin.

However, since the guide base is formed from a different material than the roller shafts, and thus differs in linear expansion from the roller shafts, when the ambient temperature rises, and the guide base and the roller shafts are expanded, the degree of interference fit tends to decrease due to different degrees of expansion between the guide base and the roller shafts to such an extent that the roller shafts cannot be rotationally fixed in position any more. In such a situation, the roller shafts tend to be rotated under drag torque applied from the rollers. The rotation of the roller shafts could damage the guide base due to wear of the radially inner surfaces of the circular arc-shaped portions. It is therefore desired to more reliably rotationally fix the roller shafts in position.

Since such a chain guide is mounted in an engine room and thus is exposed to high ambient temperature, and also its rollers are rotated at high speed by contact with the timing chain, the roller shafts tend to be heated to high temperature due to contact with the rollers.

In the chain guide disclosed in Patent document 1, the end surfaces of the roller shafts are brought into contact, over the entire areas of the end surfaces, with the closed end surfaces of the circular arc-shaped portions of the respective shaft inserting recesses, which are formed in the side plates of the guide base. Thus, heat tends to be conducted from the roller shafts to the guide base, which is made of resin, thus heating the guide base and reducing strength of the guide base. It is desired to prevent reduction in strength of the guide base.

The rollers of this chain guide are roller bearings each including a shell-shaped outer race having inwardly extending flanges. Roller elements such as needle roller elements are mounted in the outer race, and are retained by a retainer also mounted in the outer race. Such roller bearings pose the following problem.

The outer races of the roller bearings are kept in rolling contact with the timing chain. When the timing chain flaps, uneven loads may be applied to the outer race of any one of the roller bearings. Such uneven loads may move the outer race and the retainer relative to each other in the axial direction until one axial end surface of the retainer contacts the inner surface of the corresponding one of the inwardly extending flanges.

Since the outer race is rotating at high speed due to contact with the timing chain in this state, the outer race rotates relative to the retainer with one of the flanges in contact with the end surface of the retainer. The shell-shaped outer race of each rolling bearing is formed by drawing a blank, subjecting the blank to heat treatment to increase hardness of the entire blank, subjecting the end portions of the blank to annealing, and bending the end portions inwardly to form the flanges, which serve to prevent the retainer from being pulled out of the bearing.

Since the flanges of the outer race are subjected to annealing, the flanges are lower in hardness than the other portion of the outer race. Since the outer race and the retainer rotate relative to each other at high speed, with one of the flanges, which are lower in hardness, in contact with the corresponding end surface of the retainer, the flanges and the retainer tend to become worn at their contact portions.

A first object of the present invention is to prevent the roller shafts from being rotated by the rollers, which are supported by the respective roller shafts, thereby preventing reduction in strength of the guide base due to wear.

A second object of the present invention is, in a chain guide in which roller bearings are used as the rollers, to reduce wear of the flanges and the retainer of each roller bearing at their contact portions, thereby prolonging the life of the chain guide.

Means for Achieving the Object

In order to achieve the first object, the present invention (first invention) provides a chain guide comprising a guide base including an opposed pair of side plates and elongated in one direction, wherein the guide base is configured to be arranged along a portion of an outer periphery of a timing chain such that the one direction coincides with the direction in which the timing chain moves, and wherein the side plates have shaft engaging portions, a plurality of roller shafts having both ends thereof supported by the respective shaft engaging portions and spaced apart from each other in the longitudinal direction of the side plates, and rollers rotatably supported by the respective roller shafts and configured to guide the timing chain, wherein the shaft engaging portions have first surface engaging portions, and the roller shafts have second surface engaging portions at the respective ends of the roller shafts which are in surface engagement with the respective first surface engaging portions, thereby rotationally fixing the roller shafts.

The present invention also provides a chain transmission device comprising a driving sprocket, a driven sprocket, a timing chain trained around the driving sprocket and the driven sprocket, a pivotable chain guide provided on one side of the slack side of the timing chain to guide the movement of the timing chain, wherein the chain guide is pivotable about one end of the chain guide, and a chain tensioner configured to apply an adjusting force to a remote end of the chain guide which is remote from the one end of the chain guide, thereby pressing the remote end against the timing chain, wherein as the pivotable chain guide, the chain guide according to the present invention is used.

This chain transmission device may further includes a fixed chain guide fixed in position on one side of the tension side of the timing chain to guide the movement of the timing chain, wherein the fixed chain guide is the chain guide according to the present invention. With this arrangement, it is possible to further effectively reduce flapping of the timing chain.

Since the chain guide according to the first invention includes the above-described first and second surface engaging portions, when the timing chain moves and the rollers, which are in contact with the timing chain, are rotated, drag torque is applied from the rollers to the roller shafts. However, the surface engaging portions support such drag torque, thus preventing rotation of the roller shafts.

Since the roller shafts are rotationally fixed in position by the surface engaging portions, even if the roller shafts are made of steel and the guide base is made of synthetic resin, which means that the roller shafts and the guide base are different in linear expansion coefficient from each other, and thus are expanded to different degrees when heated, the roller shafts can be reliably rotationally fixed in position.

Each of the shaft engaging portions may comprise a tapered groove section extending from a side surface of a corresponding side plate facing the timing chain in the width direction of the corresponding side plate, and a circular shaft supporting section connected to the narrow end of the tapered groove section and configured to support one end of one of the roller shafts, wherein the narrow end has a width smaller than the outer diameters of the roller shafts.

In this arrangement, the first surface engaging portions may be in the form of first recessed or protruding surfaces or first flat surfaces formed on the inner peripheries of the respective shaft supporting sections, and the second surface engaging portions may be in the form of second recessed or protruding surfaces or second flat surfaces formed on the outer peripheries of the ends of the roller shafts and configured to be brought into surface engagement with the respective first recessed or protruding surfaces or first flat surfaces.

Alternatively, the first surface engaging portions may comprise guide ribs extending from radial load supporting surfaces formed on the inner peripheries of the respective shaft supporting sections to openings of the respective shaft engaging portions, and the second surface engaging portions may comprise guide grooves formed in the respective end surfaces of the roller shafts, which are circular in shape, to extend in the diametrical directions of the end surfaces of the roller shafts, wherein each of the guide ribs has two side surfaces and is fitted in a corresponding one of the guide grooves with the two side surfaces in surface engagement with inner side walls of the corresponding one of the guide grooves.

If the above-described recessed or protruding surfaces or flat surfaces are used as the surfaces engaging portions, two of the recessed or protruding surfaces or two of the flat surfaces may be formed on the outer periphery of each of the ends of the roller shafts so as to be diametrically opposed to each other and symmetrical to each other with respect to a plane including the axis of the roller shaft. With this arrangement, the roller shafts can be inserted in the respective shaft engaging portions in either of the two diametrically opposite positions. This in turn makes it easier to assemble the chain guide.

In a further alternative arrangement, each of the first surface engaging portions comprises two mutually opposed first flat surfaces formed on the inner periphery of one of the shaft supporting sections, and each of the second surface engaging portions comprises two mutually opposed second flat surfaces formed on the outer periphery of one of the end portions of the roller shafts and kept in surface engagement with the corresponding two first flat surfaces, with the two mutually opposed first flat surfaces spaced apart from each other by the same distance as the width of the narrow end of the tapered groove section. In this arrangement, an anti-separation protrusion is formed on a portion of a wall surface of each shaft engaging portion where the corresponding one of the end surfaces of the roller shafts is opposed such that the anti-separation protrusion is brought into engagement with an upper portion of the outer periphery of the roller shaft, thereby preventing separation of the roller shaft.

Preferably, the anti-separation protrusion is elastically deformable in the axial direction of the roller shaft, and formed with an inclined guide surface on the inner surface of the anti-separation protrusion which faces the roller shaft. With this arrangement, when the roller shafts are inserted into the shaft engaging portions, the end surfaces of the roller shafts press the guide surfaces, thus causing the anti-separation protrusions to be smoothly deformed such that the ends of the rollers can be moved past the protrusions.

Once the ends of the roller shafts are moved past the anti-separation protrusions and supported by the shaft supporting sections, the anti-separation protrusions return to their original position by their own elasticity, thus engaging the outer peripheries of the ends of the roller shafts. The roller shafts can thus be smoothly mounted in position.

In the chain guide according to the present invention, the guide base may be formed of a synthetic resin. In this case, the ends of the roller shafts, which are made of steel, may be fixed to the side plates by insert molding. In this arrangement, the shaft engaging portions are holes formed in the side plates in which the ends of the roller shafts are supported.

Since the chain guide is mounted in an engine room and thus is exposed to high ambient temperature, and also its rollers are rotated at high speed by contact with the timing chain, the roller shafts tend to be heated to high temperature due to contact with the rollers. According to the present invention, however, by the provision of the second surface engaging portions on the ends of the roller shafts, the area of each shaft end surface is smaller than the cross-sectional area of the roller shafts at the axial central portion thereof, so that heat conduction to the guide base from the roller shafts is small. This prevents reduction in strength of the guide base, which is made of synthetic resin, by being heated.

In order to further effectively suppress a temperature rise of the guide base due to heat conduction from the roller shafts to the guide base, gaps may be defined between the respective end surfaces of the roller shafts and wall surfaces of the shaft engaging portions facing the respective end surfaces of the roller shafts.

Further, in order to reduce the contact surface areas between the side plates of the guide base and the end surfaces of the roller shafts, thereby further effectively suppressing a temperature rise of the guide base due to heat conduction, each of the roller shafts may have curved surface portions having a circular arc-shaped cross-section between the outer peripheral surface and the respective end surfaces, of the roller shaft, and/or each of the shaft engaging portions may have a window formed in its wall surface facing the corresponding one of the end surfaces of the roller shafts and extending to the outer side surface of the side plate.

In order to achieve the second object, the present invention (second invention) provides a chain guide comprising a guide base including side plates and elongated in one direction, wherein the guide base is configured to be arranged along a portion of an outer periphery of a timing chain such that the one direction coincides with a direction in which the timing chain moves, a plurality of roller shafts having ends supported by the side plates and spaced apart from each other in the longitudinal direction of the side plates, and rollers rotatably supported by the respective roller shafts and configured to guide the timing chain, wherein each of the rollers is a roller bearing comprising an outer race having inwardly extending flanges at two respective axial ends of the outer race, roller elements mounted in the outer race, and a retainer mounted in the outer race and retaining the roller element, wherein the flanges of the outer race have a first hardness value and the retainer has a second hardness value, wherein the first and second hardness values are both equal to or higher than 650 in Vickers hardness HV, and are substantially equal to each other.

According to the second invention, since the flanges of the outer race and the retainer have hardness values which are both equal to or higher than 650 in Vickers hardness HV, and are substantially equal to each other, even if the outer race is moved in the axial direction under uneven loads applied from the timing chain until one of the inwardly extending flanges of the outer race contacts the corresponding end surface of the retainer, and the outer race and the retainer rotate relative to each other with the flange in contact with the end surface of the retainer, there will be no premature wear of the contact surfaces.

As used herein, the language "first and second hardness values are substantially equal to each other" is understood to mean that the difference between the first and second hardness value is not larger than 50 in Vickers hardness HV.

In the chain guide according to the present invention, by simultaneously subjecting the outer race and the retainer of each roller bearing to heat treatment with the retainer mounted in the outer race, it is possible to extremely easily adjust the hardness values of the flanges of the outer race and the retainer so as to be substantially equal to each other.

Preferably, for each of the roller bearings, the end surfaces of the retainer, which face the respective flanges, are flat surfaces extending parallel to the inner surfaces of the respective flanges, and the flanges have inner diameters smaller than the inner diameters of the retainer at the respective ends of the retainer. With this arrangement, since the end surfaces of the retainer are flat surfaces, whenever either of the end surfaces comes into contact with the inner surface of the flange of the outer race, the end surface contacts the inner surface of the flange over the entire area of the end surface. Thus, the contact surface pressure is low, which further effectively prevents wear of the contact portions.

For each of the roller bearings, the retainer may be formed by bending a strip of steel plate into a cylindrical shape, and welding together abutment end surfaces of the thus bent strip. In this case, the abutment end surfaces are welded together such that a bulge due to welding does not protrude from the end surfaces of the retainer in order to prevent the bulge from contacting either of the inner surfaces of the flanges of the outer race.

Advantages of the Invention

According to the first invention, by the provision of the first and second surface engaging portions on the ends of the roller shafts and the shaft engaging portions, respectively, such that the surface engaging portions receive drag torque applied from the rollers to the roller shafts, it is possible to reliably rotationally fix the roller shafts. This in turn prevents wear of the shaft engaging portions due to contact with the roller shafts, and thus damage to the guide base.

According to the second invention, since the inwardly extending flanges provided at both ends of the outer race and the retainer have hardness values which are both equal to or higher than 650 in Vickers hardness HV, and are substantially equal to each other, it is possible to reduce wear of the flanges of the outer race and the retainer at their contact portions. This in turn prolongs the life of the chain guide.

BRIEF DESCRIPTION OF THE DRAWINGS

FIG. 11($b$) is a right-hand side view of FIG. 11($a$).

BEST MODE FOR EMBODYING THE INVENTION

Figure 1:
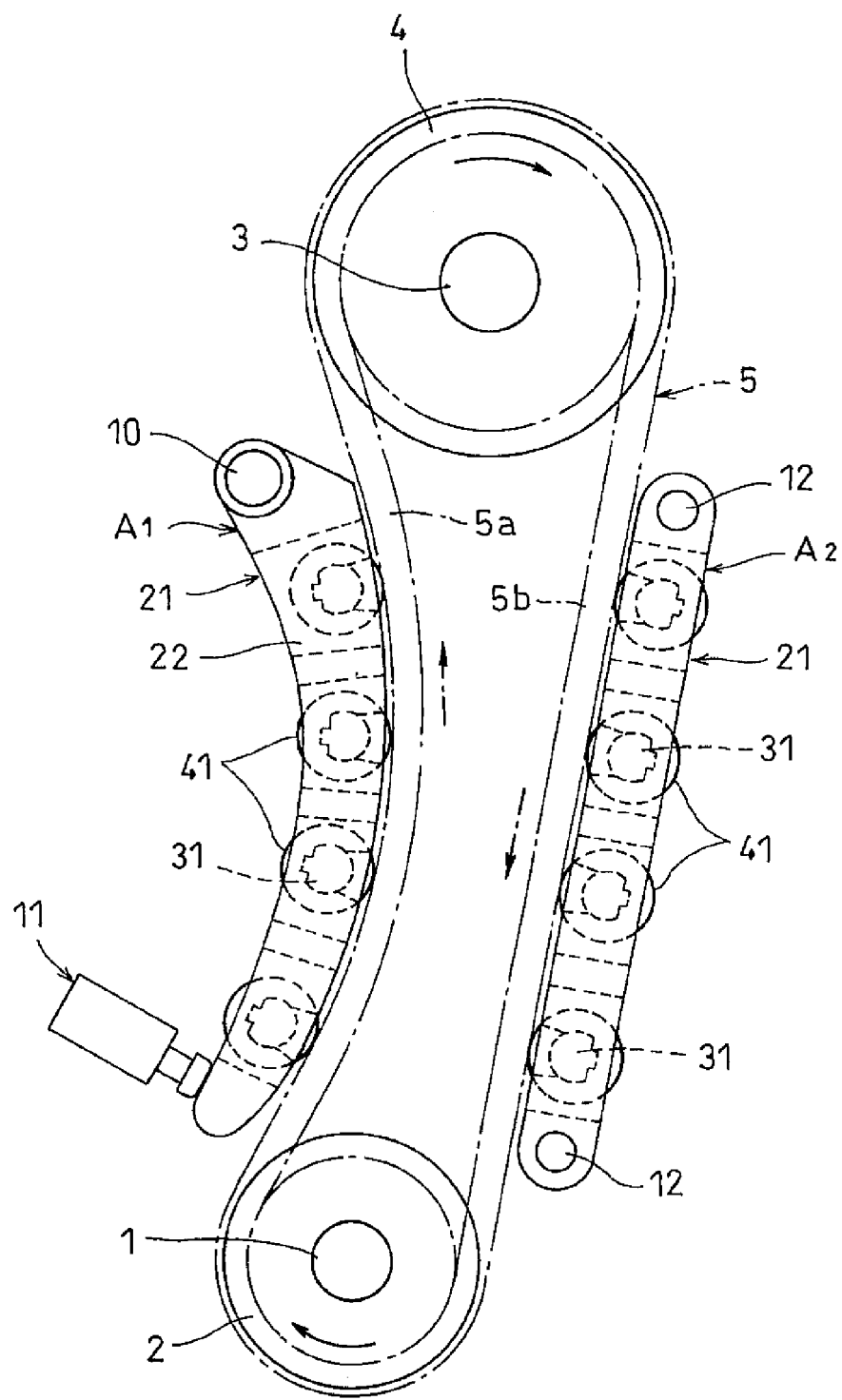
FIG. 1 schematically shows a chain transmission device embodying the present invention.

Now referring to the drawings, the embodiment of the present invention is described. FIG. 1 shows a chain transmission device for driving a camshaft which includes a timing chain 5 trained around a driving sprocket 2 mounted to one end of a crankshaft 1 and a driven sprocket 4 mounted to one end of a camshaft 3.

The timing chain 5 may be a roller chain or a silent chain.

The crankshaft 1 is rotated in the direction of the arrow in FIG. 1. When the crankshaft 1 is rotated in this direction, the timing chain 5 is moved in the direction shown by the arrows in FIG. 1. Thus, the portion of the chain 5 moving upward becomes a slack side 5$a$, and the portion of the chain 5 moving downward becomes a tight side 5$b$. A chain guide $A_1$ is provided on a first side of the slack side 5$a$ of the chain 5.

The chain guide $A_1$ is elongated in the moving direction of the timing chain 5, and has its top end supported by a pivot shaft 10 protruding from an engine block so as to be pivotable about the pivot shaft 10. The chain transmission device further includes a chain tensioner 11 which is positioned to apply an adjusting force to the bottom end portion of the chain guide, i.e. the end portion remote from the pivot shaft 10, thereby pressing the chain guide against the slack side 5$a$ of the chain 5.

Another chain guide $A_2$ is provided on a second side, which is opposite to the first side, of the tight side 5$b$ of the chain 5. Similar to the pivotable chain guide $A_1$, the chain guide $A_2$ is also elongated in the moving direction of the chain 5, but differs from the chain guide $A_1$ in that the chain guide $A_2$ is fixed in position at both ends thereof by bolts 12 threaded into the engine block and tightened, to guide the moving timing chain 5.

The pivotable chain guide $A_1$ and the fixed chain guide $A_1$ are identical in structure, except that the pivotable chain guide $A_2$ is formed with a shaft insert hole at one end thereof, while the fixed chain guide $A_2$ is formed with bolt insert holes at the respective ends thereof.

Therefore, only the pivotable chain guide $A_1$ is described below, and the elements of the fixed chain guide $A_2$ that correspond to those of the pivotable chain guide $A_1$ are denoted by identical numerals.

Figure 2:
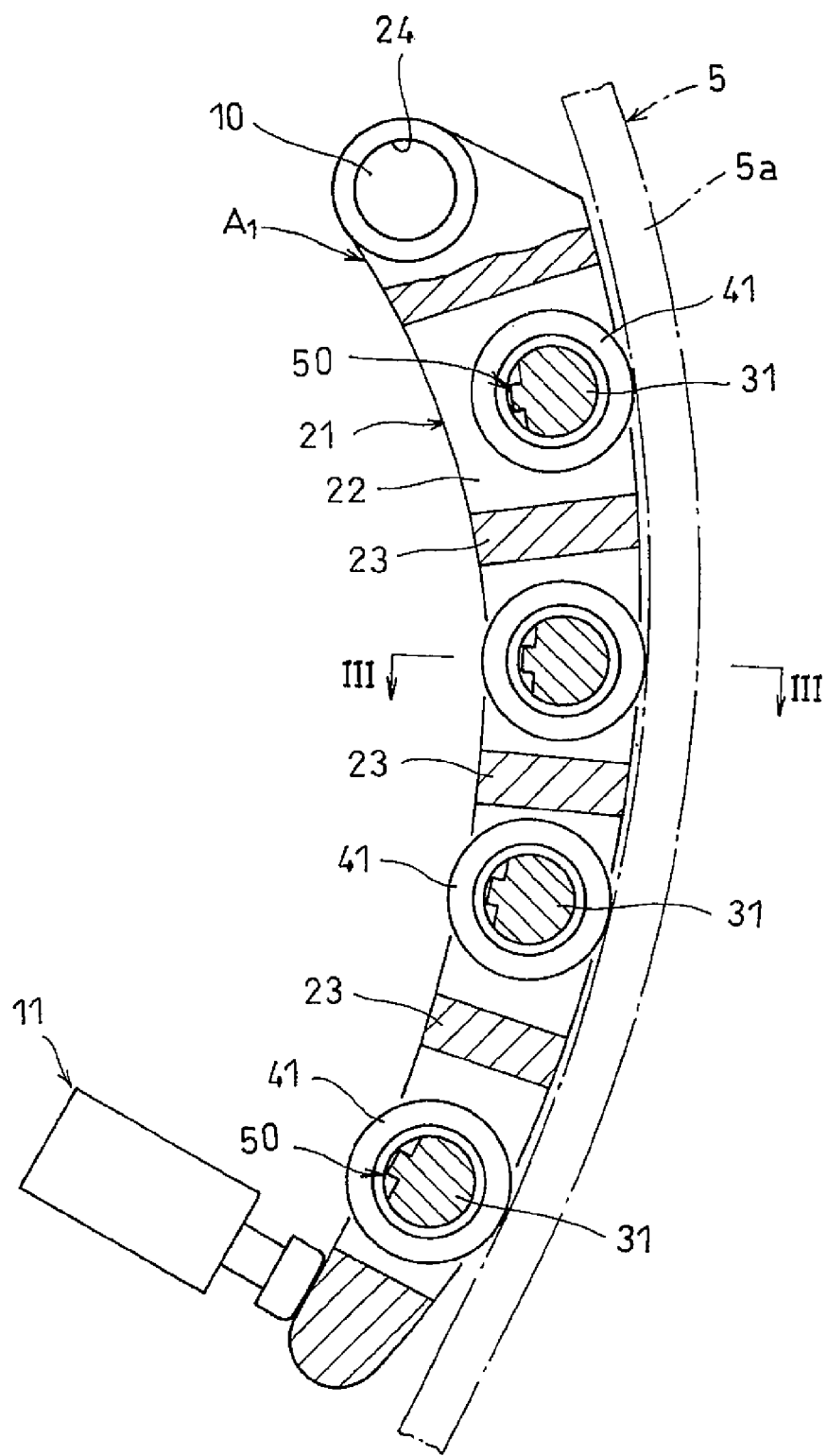
FIG. 2 is a longitudinal sectional view of a chain guide shown in FIG. 1.
Figure 3:
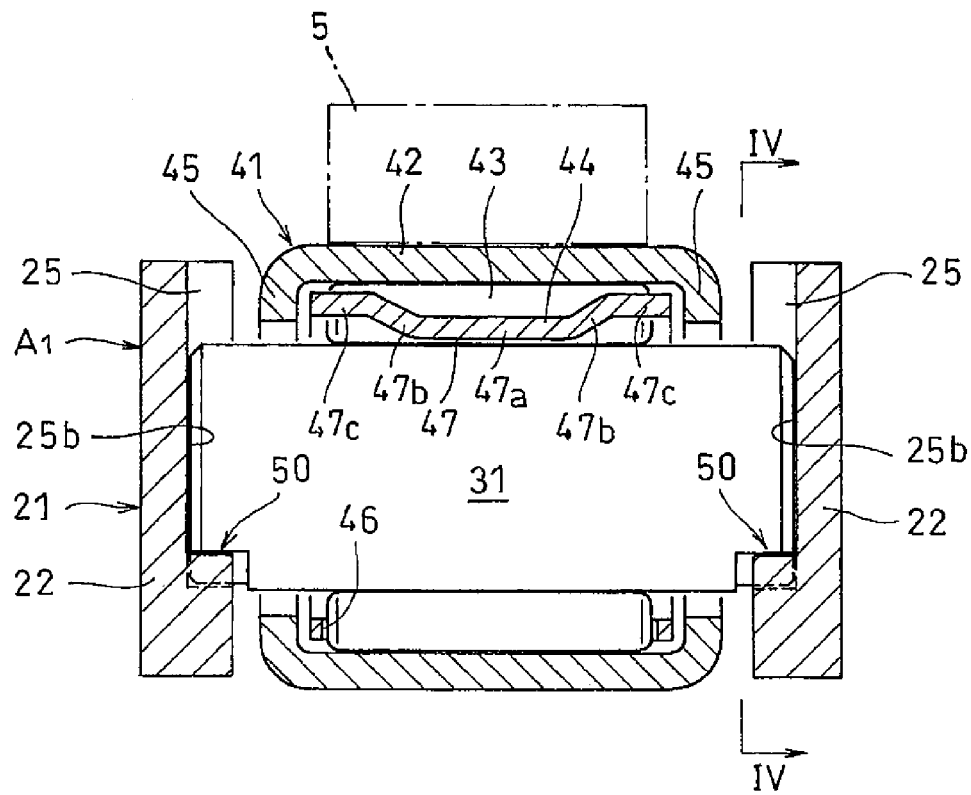
FIG. 3 is a sectional view taken along line III-III of FIG. 2.
Figure 4:
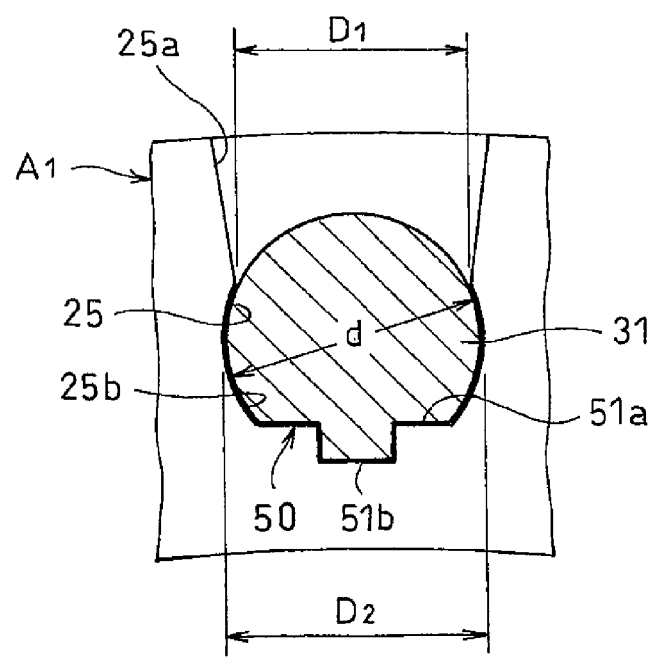
FIG. 4 is a sectional view taken along line Iv-Iv of FIG. 3.

As shown in FIGS. 2 to 4, the chain guide $A_1$ includes a guide base 21 elongated in the moving direction of the timing chain 5, and a plurality of roller shafts 31 arranged spaced apart from each other in the length direction of the guide base 21. Rollers 41 are rotatably supported by the respective roller shafts 31 to guide the chain.

The guide base 21 includes an opposed pair of side plates 22 spaced apart from each other by a plurality of spacer plates 23 spaced apart from each other in the length direction of the guide base 21. The side plates 22 are bow-shaped members formed with shaft insert holes 24 at the top ends thereof through which the pivot shaft 10 is inserted.

The side plates 22 have opposed inner surfaces each formed with a plurality of shaft engaging portions 25 spaced apart from each other in the length direction of the side plates 22. The shaft engaging portions 25 of the side plates 22 support the respective ends of the roller shafts 31.

Each of the shaft engaging portions 25 includes a tapered groove section 25$a$ extending from the outer surface of the side plate 22 facing the timing chain 5 in the width direction of the side plate 22 such that the width of the tapered groove section 25$a$ gradually decreases from its opening at the outer surface of the side plate 22. The shaft engaging portion 25 further includes a shaft supporting section 25$b$ as a closed end portion which is connected to the narrow end of the tapered groove section 25$a$. The roller shafts 31 are inserted through the tapered groove sections 25$a$ of the respective shaft engaging portions 25 into the shaft supporting sections 25$b$ and supported by the shaft supporting sections 25$b$.

The roller shafts 31 have an outer diameter d larger than the width $D_1$ of the narrow end of the tapered groove section 25$a$ of each shaft engaging portion 25, and equal to or smaller than the inner diameter $D_2$ of the shaft supporting section 25$b$. But instead, these dimensions may be determined to satisfy the relation: $d > D_2 > D_1$.

The shaft engaging portions 25 are arranged such that the centers of the shaft supporting sections 25$b$ lie on a convex circular arc. However, the shaft engaging portions 25 may be arranged such that the centers of the shaft supporting sections 25$b$ lie on a curve other than a convex circular arc.

The guide base 21 is formed from a synthetic resin. The synthetic resin used is preferably a resin that is oil-resistant and weather-resistant and of high strength. Such resins include polyamide 46 (PA46) and polyamide 66 (PA66). If it is desired to further improve mechanical strength, the resin is preferably reinforced with reinforced glass fiber.

The guide base 21 may be formed by casting or die-casting a light metal such as an aluminum alloy or a magnesium alloy.

The roller shafts 31 are fitted in the respective shaft engaging portions 25 and supported by their shaft supporting sections 25$b$. The shaft supporting sections 25$b$ are formed with surface engaging portions 50 which can engage corresponding surface engaging portions 50 formed on the respective roller shafts 31, thereby rotationally fixing the roller shafts 31.

The surface engaging portions 50 are non-cylindrical surfaces which are brought into surface-to-surface engagement with each other. In FIG. 4, each shaft support portion 25b has at its closed end portion a first recessed or protruding surface 51a, as a surface engaging portion 50, while the roller shafts 31 have, on the outer periphery of each end thereof, a second recessed or protruding surface 51b, as another surface engaging portion 50, which is complimentary in shape to the first recessed or protruding surfaces 51a and brought into surface-to-surface engagement with the corresponding first recessed or protruding surface 51b.

The roller shafts 31 are made of e.g. SUJ2 or SC material. The roller shafts 31 are subjected to heat treatment to increase hardness and thus wear resistance, of the roller shafts 31. As such heat treatment, bright quenching is used in the embodiment, but instead, such heat treatment may be induction hardening or carburizing. Further alternatively, such heat treatment may be carbonitriding.

The rollers 41 are rotatably supported by the respective roller shafts 31. The rollers 41 are roller bearings in the embodiment. The roller bearings 41 each include an outer race 42 in which a plurality roller elements 43 are mounted. The roller elements 43 are retained in position by a retainer 44.

The outer race 42 is a shell-shaped member formed by drawing a metal plate made of e.g. SPC or SCM. The outer race 42 is subjected to heat treatment to increase its hardness. The shell-shaped outer race 42 has inwardly extending flanges 45 at both ends thereof which prevent the retainer 44 from being pulled out of the outer race. The inwardly extending flanges 45 are formed by bending after mounting the retainer 44, which retains the roller elements 43, in the outer race 42 so that the roller bearing 41 can be assembled easily.

The retainer 44 is formed with a plurality of pockets 46 arranged in the circumferential direction of the retainer 44. The roller elements 43 are received in the respective pockets 46. The retainer 44 has crossbars 47 defined between respective adjacent pairs of the pockets 46 and each comprising an inner crossbar portion 47a located inwardly of the pitch circle of the roller elements 43 and having two axial ends, inclined crossbar portions 47b integrally connected to the respective axial ends of the inner crossbar portion 47a and each having an outer axial end, and outer crossbar portions 47c integrally connected to the outer axial ends of the respective inclined crossbar portions 47b and located outwardly of the pitch circle of the roller elements 43. The retainer 44 thus has a V-shaped section.

The roller bearings may be needle roller bearings or cylindrical roller bearings. Also, the roller bearings may be full complement roller bearings, i.e. bearings having no retainer.

In the chain transmission of the embodiment, while the rotation of the crankshaft 1 is being transmitted to the camshaft 3 through the movement of the timing chain 5, which is trained around the driving sprocket 2 and the driven sprocket 4, when the tension of the timing chain 5 fluctuates due to load fluctuations, the chain tensioner 11 is activated to eliminate such fluctuations in tension, thus keeping the tension of the timing chain 5 within a predetermined range at all times.

While the rotation (torque) of the crankshaft 1 is being transmitted to the camshaft 3, the rollers 41 or roller bearings of the pivotable chain guide $A_1$ and the stationary chain guide $A_2$ are rotated by contact with the timing chain 5, while the timing chain 5 is kept in rolling contact with and guided by the rollers 41.

Since the timing chain 5 is guided by the rolling motion of the rollers 41, friction between the contact portions of the rollers 41 and the chain 5 is low. The moving resistance of the timing chain 5 is also small. Thus, the timing chain 5 can move smoothly and thus can transmit torque without loss.

When the rollers 41 of the pivotable chain guide $A_1$ and the fixed chain guide $A_2$ are rotated by contact with the timing chain 5, drag torque is transmitted from the rollers 41 to the respective roller shafts 31.

Drag torque applied to the roller shafts 31 is received by the surface engaging portions 50 provided between the end portions of the roller shafts 31 and the shaft supporting sections 25b of the shaft engaging portions 25, and thus cannot rotate the roller shafts 31.

Since the roller shafts 31 are not rotated by drag torque, the shaft supporting sections 25b of the shaft engaging portions 25 never become worn due to contact with the roller shafts 31. This prevents damage to the guide base 21.

If the surface engaging portions 50 are in the form of the above-described first and second recessed or protruding surfaces 51a and 51b, a pair of the second recessed or protruding surfaces 51b are preferably formed on the outer periphery of each end portion of the roller shafts 31 so as to be symmetrical to each other with respect to a plane including the axis of the roller shaft 31. With this arrangement, the roller shafts 31 can be inserted in the respective shaft engaging portions 25 in either of the two diametrically opposite positions. This in turn makes it easier to assemble the chain guide.

Figure 5:
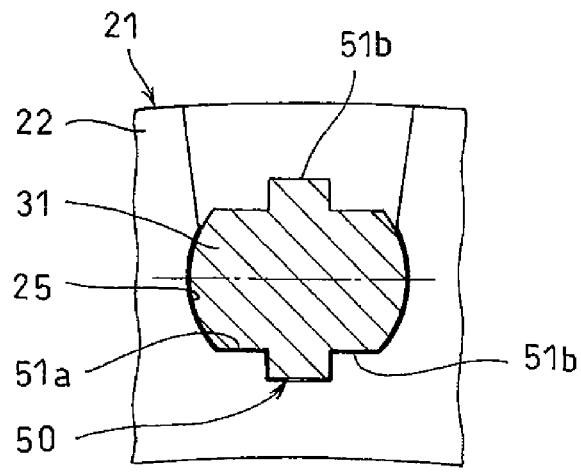
FIG. 5 is a sectional view showing a different surface engaging portion.

In FIGS. 4 and 5, the surface engaging portions 50 are the above-described first and second recessed or protruding surfaces 51a and 51b. However, the surface engaging portions 50 are not limited to such recessed or protruding surfaces 51a and 51b. FIGS. 6 to 10 show different surface engaging portions 50.

Figure 6:
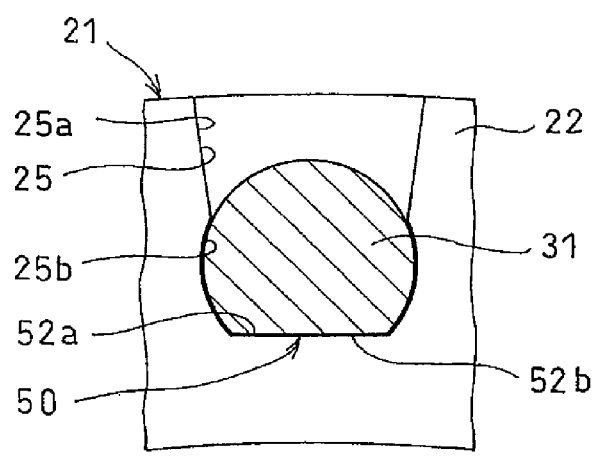
FIG. 6 is a sectional view showing a still different surface engaging portion.

The surface engaging portion 50 shown in FIG. 6 include a flat surface 52a formed on the closed end of the shaft supporting section 25b of each shaft engaging portion 25. The surface engaging portion 50 further includes a flat surface 52b formed on the outer periphery of the corresponding end of the roller shaft 31 so as to be brought into surface engagement with the flat surface 52a.

Figure 7:
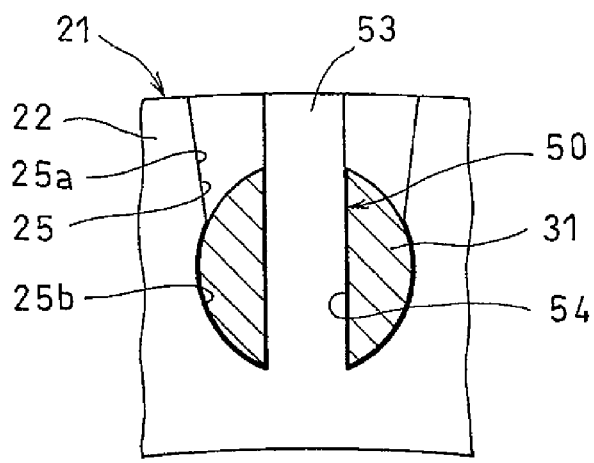
FIG. 7 is a sectional view showing a further different surface engaging portion.

The surface engaging portion 50 shown in FIG. 7 includes a guide rib 53 extending from the closed end of the shaft supporting section 25b of each shaft engaging portion 25 to the opening of the tapered groove section 25a. The guide rib 53 are fitted in a diametrically extending guide groove 54 formed in the corresponding end of the roller shaft 31 such that the two side surfaces of the guide rib 53 are brought into surface engagement with the respective side walls of the guide groove 54.

Figure 8:
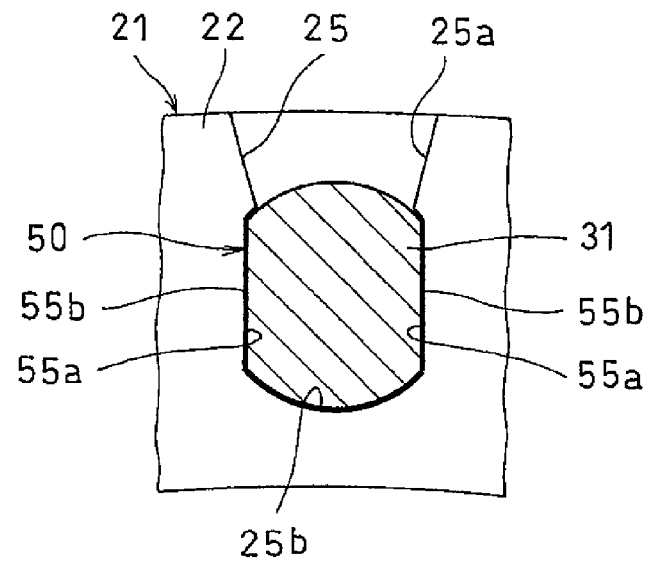
FIG. 8 is a sectional view showing a further different surface engaging portion.

The surface engaging portion 50 shown in FIG. 8 includes an opposed pair of flat surfaces 55a formed on the inner periphery of the shaft supporting section 25b of each shaft engaging portion 50. The surface engaging portion 50 further includes an opposed pair of flat surfaces 55b formed on the outer periphery of the corresponding end of the roller shaft 31 so as to be brought into surface engagement with the respective flat surfaces 55a.

In FIG. 8, the tapered groove sections 25a of the shaft engaging portions 25 have, at their narrow ends, widths smaller than the distances between the respective pairs of flat surfaces 55b formed on the outer peripheries of the ends of the roller shafts 31 so as to prevent separation of the roller shafts 31 from the shaft engaging portions 25 at the narrow ends of the tapered groove sections 25a. Alternatively, in the embodiment of FIGS. 9 and 10, each tapered groove section 25a has, as shown in FIG. 10, an opposed pair of side walls "w" integrally connected to the ends of the respective flat surfaces 55a and moderately inclined outwardly away from each other.

Figure 9:
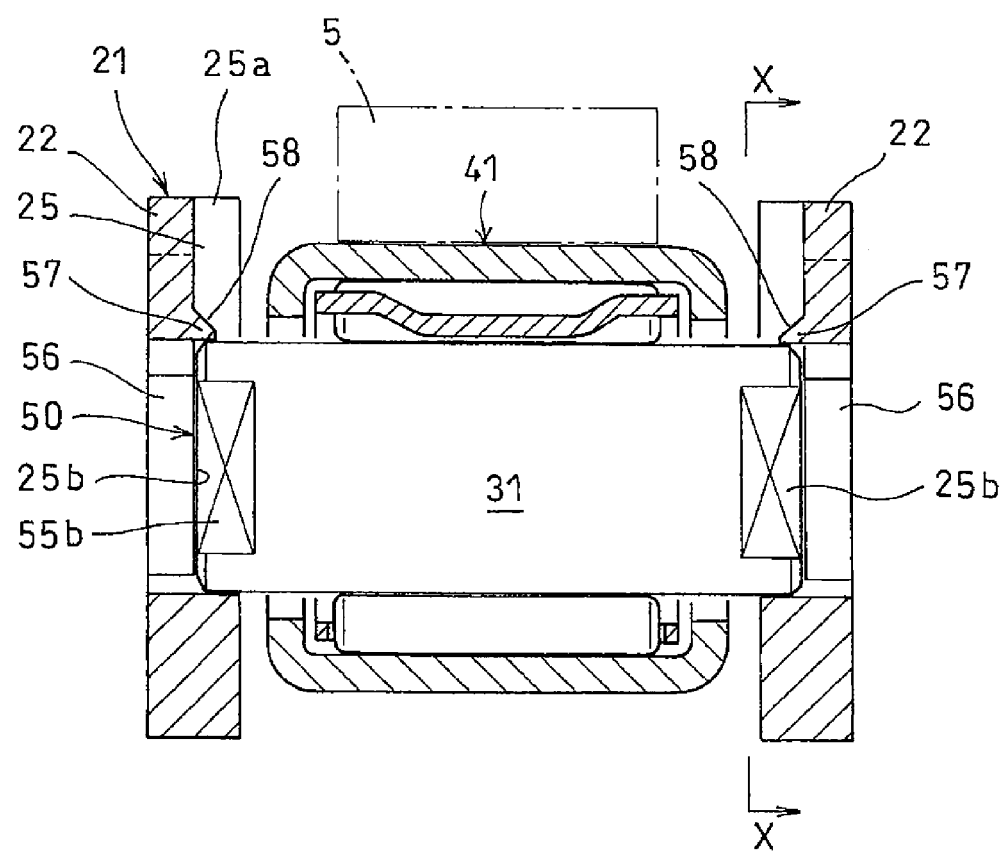
FIG. 9 is a sectional view showing a yet different surface engaging portion.
Figure 10:
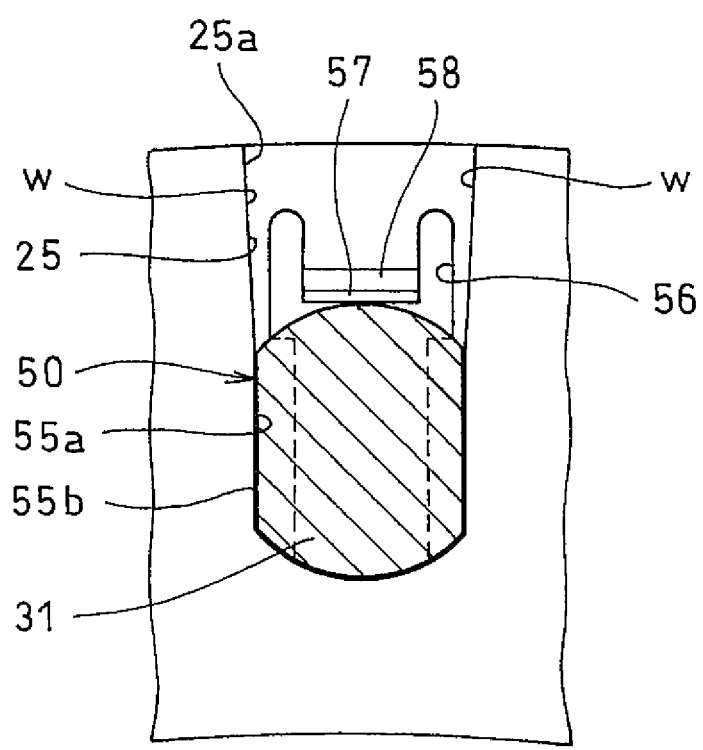
FIG. 10 is a sectional view taken along line X-X of FIG. 9.

In the embodiment of FIGS. 9 and 10, it is impossible to prevent separation of the roller shafts 31 at the narrow ends of the tapered groove sections 25a. Thus, in this embodiment, a window 56 is formed in the inner surface of each shaft engaging portion 25 facing the end surface of the roller shaft 31, and an elastically deformable anti-separation protrusion 57 is formed to extend downwardly from the top edge of the window 56 so as to engage the outer periphery of the end of the roller shaft 31 at its upper portion, thereby preventing separation of the roller shaft 31.

In order to prevent the roller shafts 31 from being pulled out of the windows 56, the windows 56 have widths smaller than the width of the roller shafts 31 between the respective pairs of flat surfaces 55b formed on the outer peripheries of the ends of the roller shafts 31.

Each anti-separation protrusion 57 is formed with an inclined guide surface 58 on its inner surface facing the roller shaft 31. With this arrangement, when the roller shafts 31 are inserted into the shaft engaging portions 25, the end surfaces of the roller shafts 31 press the guide surfaces 58 of the anti-separation protrusions 57, thus causing the anti-separation protrusions 57 to be smoothly deformed such that the ends of the rollers 31 can be moved past the protrusions 57. Once the ends of the roller shafts 31 are moved past the anti-separation protrusions 57 and supported by the shaft supporting sections 25b, the anti-separation protrusions 57 return to their original position by their own elasticity, thus engaging the outer peripheries of the ends of the roller shafts. The roller shafts 31 can thus be smoothly mounted in position.

Any of the surface engaging portions 50 shown in FIGS. 6 to 10 can reliably prevent rotation of the roller shafts 31.

Figure 11A:
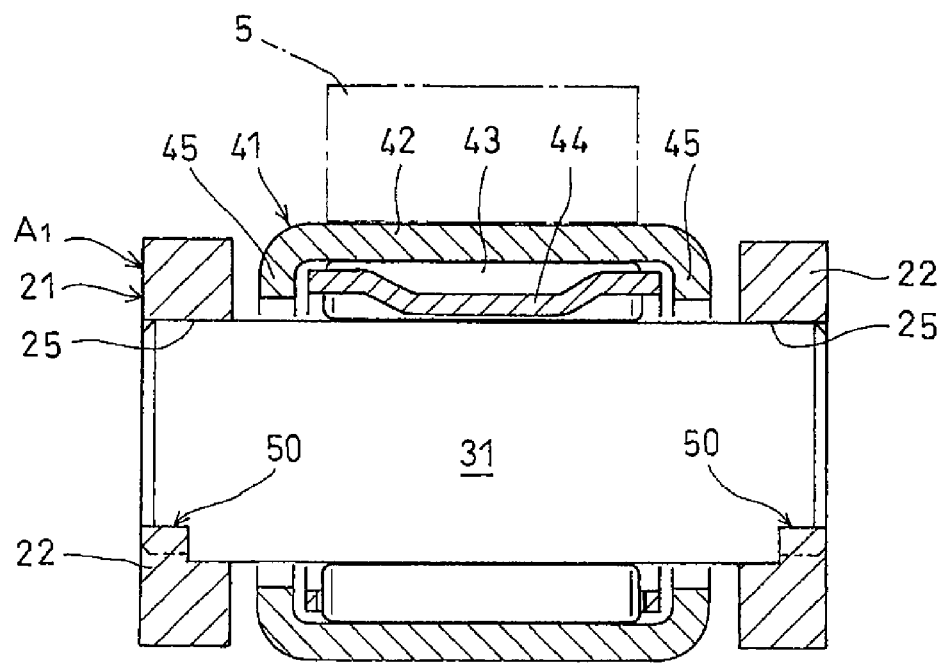
FIG. 11($a$) is a sectional view of a different chain guide.
Figure 11B:
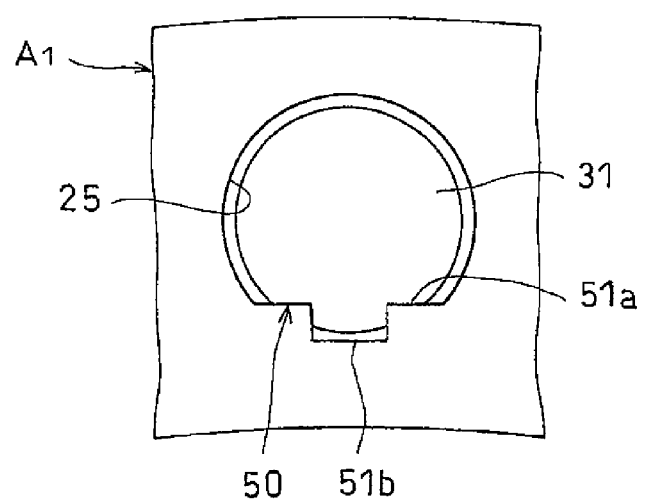

If the guide base 21 is formed by molding a synthetic resin, with the roller shafts 31 inserted in the respective roller bearings 41, the ends of the roller shafts 31 may be fixed to the side plates 22 by insert molding. FIGS. 11(a) and 11(b) show a chain guide $A_1$ of which the roller shafts 31 are fixed to the side plates 22 by insert molding. In this embodiment, the shaft engaging portions are holes 25 formed in the side plates 22 and supporting the ends of the roller shafts 31. The surface engaging portions 50 are formed between the shaft engaging portions 25 and the corresponding roller shafts 31.

As the surface engaging portions 50, the first and second recessed or protruding surfaces 51a and 51b are shown in FIGS. 11(a) and 11(b), but those shown in any of FIGS. 5 to 8 may be used instead.

Figure 12:
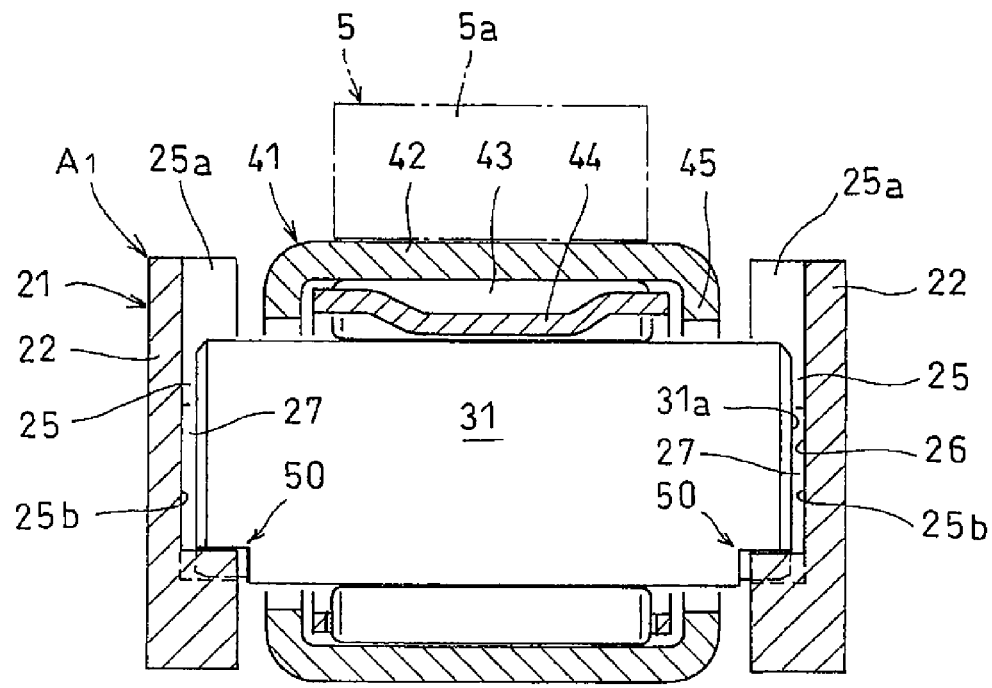
FIG. 12 is a vertical sectional view of a different chain guide embodying the present invention.

FIG. 12 shows a chain guide according to a different embodiment of the invention. The chain guide $A_1$ of this embodiment differs from the chain guide $A_1$ shown in FIG. 3 only in that a gap 27 is defined between each of the end surfaces 31a of the roller shafts 31 and wall surface 26 of the corresponding shaft engaging portion 25 facing the end surface 31a. Thus, elements corresponding to those of the chain guide $A_1$ shown in FIG. 3 are denoted by identical numerals, and their description is omitted.

The gaps 27 minimize heat conduction from the roller shafts 31 to the side plates 22 when the roller shafts 31 are heated due to high-speed rotation of the roller 41, thus reducing the possibility of the guide base 21, which is made of synthetic resin, being heated to high temperature and the resulting reduction in strength of the guide base 21.

Figure 13:
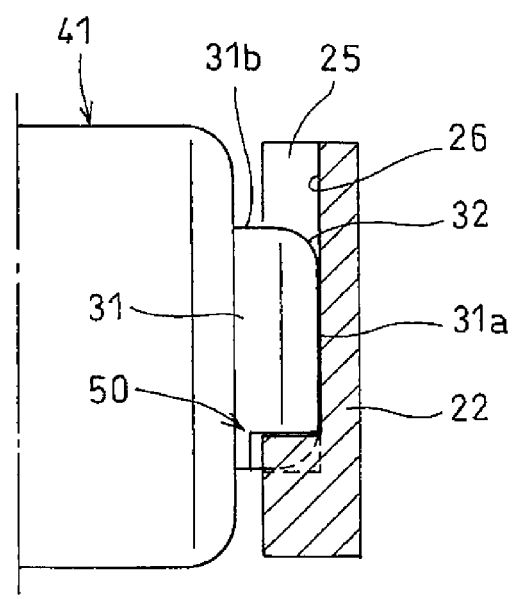
FIG. 13 is a sectional view showing a different means for reducing heat conduction from a roller shaft to a guide base.
Figure 14:
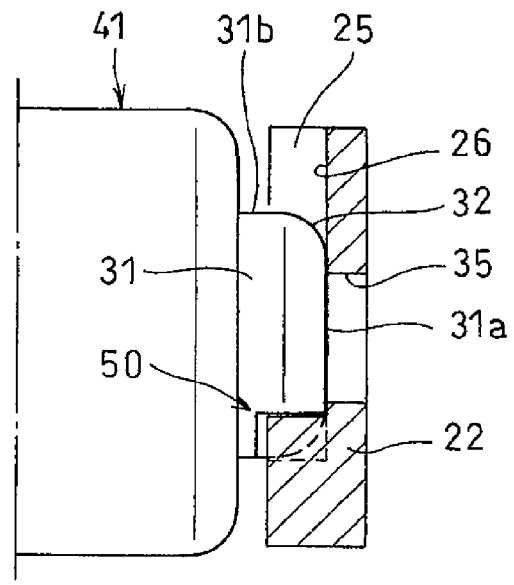
FIG. 14 is a sectional view showing a still different means for reducing heat conduction from a roller shaft to the guide base.

FIGS. 13 and 14 show different means for preventing heat conduction from the roller shafts 31 to the side plates 22. In FIG. 13, each roller shaft 31 is formed with curved surface portions 32 having a circular arc section at the boundaries between the respective end surfaces 31a and the cylindrical radially outer surface 31b, of the roller shaft 31. By the provision of the curved surface portions 32, the contact surface area between each end surface 31a and the wall surface 26 is smaller than the cross-sectional area of the roller shaft 31 at the axial central portion thereof, so that it is possible to reduce heat conduction to the side plates 22 of the guide base 21.

In the embodiment of FIG. 14, curved surface portions 32 are formed at the outer peripheral portions of the end surfaces 31a of the roller shafts 31, while each of the shaft engaging portions 25 has a window 35 in the form of a through-hole formed in the wall surface 26 at its portion facing the end surface of the roller shaft 31 and having a diameter smaller than the outer diameter of the roller shaft 31. The curved surface portions 32 and the windows 35 in combination reduce the contact surface area between the end surfaces 31a of the roller shafts 31 and the wall surfaces 26, thereby reducing heat conduction to the guide base 21.

Figure 15:
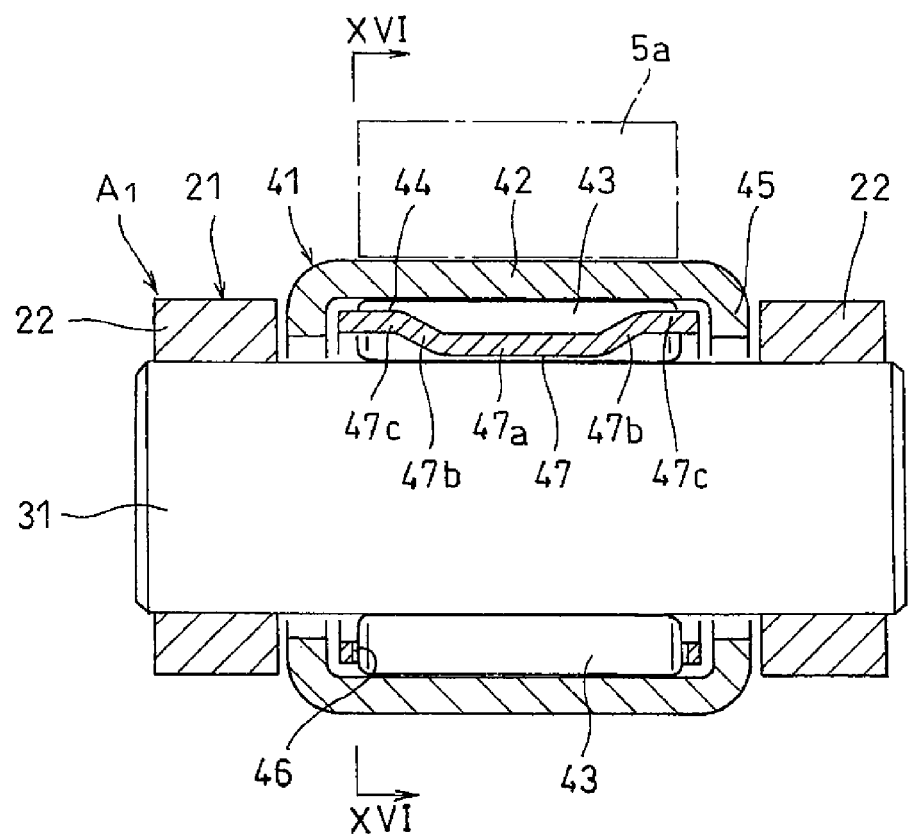
FIG. 15 is a sectional view showing a further different means for reducing heat conduction from a roller shaft to the guide base.
Figure 16:
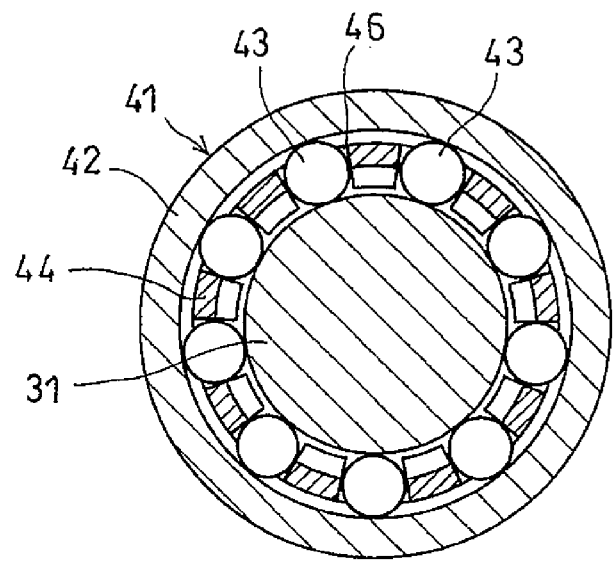
FIG. 16 is a sectional view taken along line XVI-XVI of FIG. 15.
Figure 17:
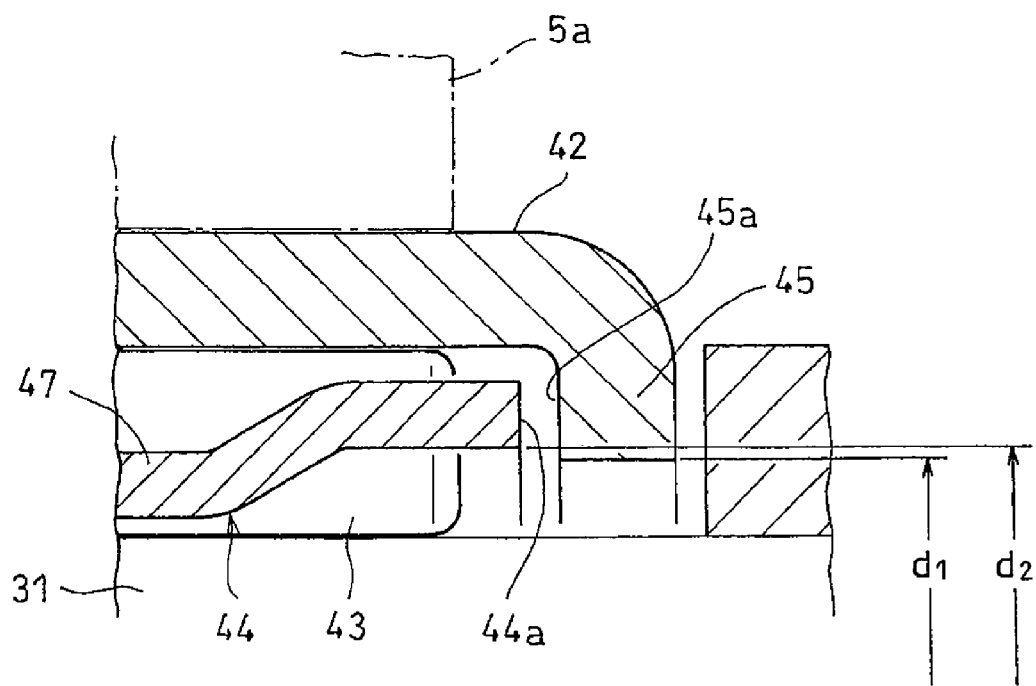
FIG. 17 is a partial enlarged view of FIG. 15.

FIGS. 15 to 17 show a chain guide $A_1$ according to still another embodiment of the invention. In this chain guide $A_1$ too, the roller shafts 31 have their both ends supported by the opposed pair of side plates 22 of the guide base 21, and the rollers 41 are rotatably supported by the respective roller shafts 31.

The guide base 21 of this embodiment differs from the guide base 21 shown in FIG. 2 only in the shape of the shaft engaging portions, which support the roller shafts, and are otherwise identical to the guide base 21 shown in FIG. 2.

Like the roller shafts 31 shown in FIG. 3, the roller shafts 31 of this embodiment are made of e.g. SUJ2 or SC material, and are subjected to heat treatment to increase hardness.

The rollers 41 are needle roller bearings each including an outer race 42 in which a plurality of roller elements 43 are mounted. The roller elements 43 are retained in position by a retainer 44.

The outer race 42 is made of low-carbon steel such as SPC or SCM steel, and is formed into a shell shape by drawing. The shell-shaped outer race 42 has inwardly extending flanges 45 at both ends thereof. After forming the flanges 45 by bending, the outer race 42 is subjected to heat treatment to increase its hardness to 650 or over in Vickers hardness HV. As such heat treatment, carburizing is used in the embodiment, but carbonitriding may be used instead.

The retainer 44 is identical in shape to the retainer 44 shown in FIG. 3.

The retainer 44 is formed from a steel plate made of low-carbon steel such as SCM or SPC steel. After mounting the retainer 44 in the outer race 42, the retainer 44 is subjected to heat treatment together with the outer race 42 to increase its hardness to 650 or over in Vickers hardness HV, and to hardness substantially equal to the hardness of the outer race 42.

As shown in FIG. 17, the inwardly extending flanges 45 of the outer race 42 have inner diameters $d_1$ smaller than the inner diameters $d_2$ of the retainer 44 at its ends. The flanges 45 prevent the retainer 44 from being pulled out of the bearing. The end surfaces 44a of the retainer 44, which faces the respective flanges 45, are flat surfaces extending parallel to the inner surfaces 45a of the flanges 45.

Instead of the needle roller bearings 41, cylindrical roller bearings may be used.

In the chain guide A₁ shown in FIGS. 15 to 17, when the timing chain 5, which is being guided by the needle roller bearings 41 while kept in rolling contact with the bearings 41, flaps, uneven loads act on the outer race 42 of each roller bearing 41, moving the outer race 42 and the retainer 44, which is retaining the rollers 43, in the axial direction relative to each other. This causes the end surfaces 44a of the retainer 44 to come into contact with the inner surfaces 45a of the inwardly extending flanges 45. Thus, if there is a large difference in hardness between the contact portions of the retainer and those of the outer ring, and/or if the contact portions of the retainer and the outer race are both low in hardness, these contact portions tend to become worn when the outer race and the retainer rotate relative to each other.

In the embodiment, however, since the inwardly extending flanges 45 of the outer race 42 and the retainer 44 are both 650 or over in Vickers hardness HV, and are substantially equal in hardness, even if the outer race 42 and the retainer 44 rotate relative to each other with the end surfaces 44a of the retainer 44 in contact with the inner surfaces 45a of the inwardly extending flanges 45, there will be no premature wear of the contact surfaces.

Since the end surfaces 44a of the retainer 44 are flat surfaces, whenever either of the end surfaces 44a comes into contact with the inner surface 45a of the flange 45 of the outer race, the end surface 44a contacts the inner surface 45a of the flange 45 over the entire area of the surface 44a. Thus, the contact surface pressure is low, which further effectively prevents wear of the contact portions.

The retainer 44 may be formed by shaving or pressing, or may be formed by bending a strip of steel plate having pockets 46 formed by punching into a cylindrical shape, and joining together the abutment end surfaces of the cylindrically bent strip by welding.

Figure 18:
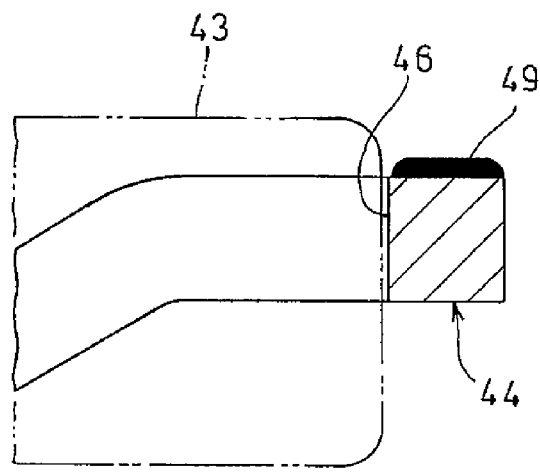
FIG. 18 is a partial sectional view of a retainer formed by welding.
Figure 19:
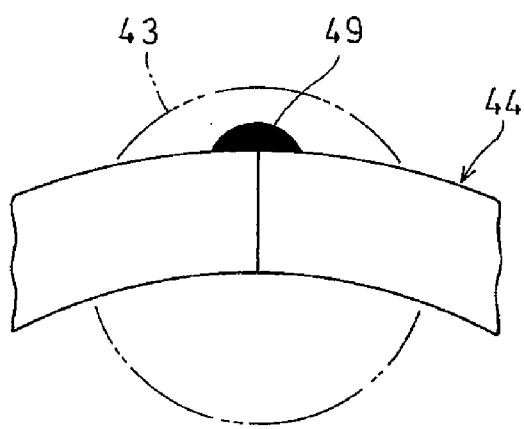
FIG. 19 is a side view of FIG. 18.
Figure 20:
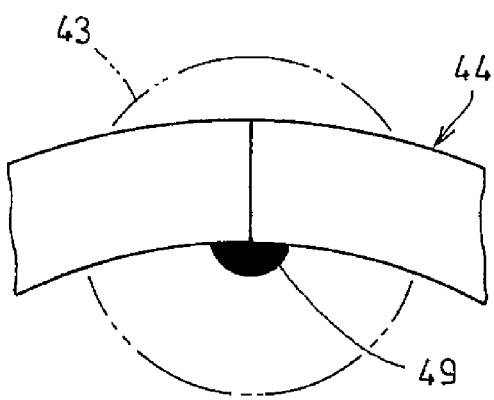
FIG. 20 is a side view of a portion of a different retainer formed by welding.
Figure 21:
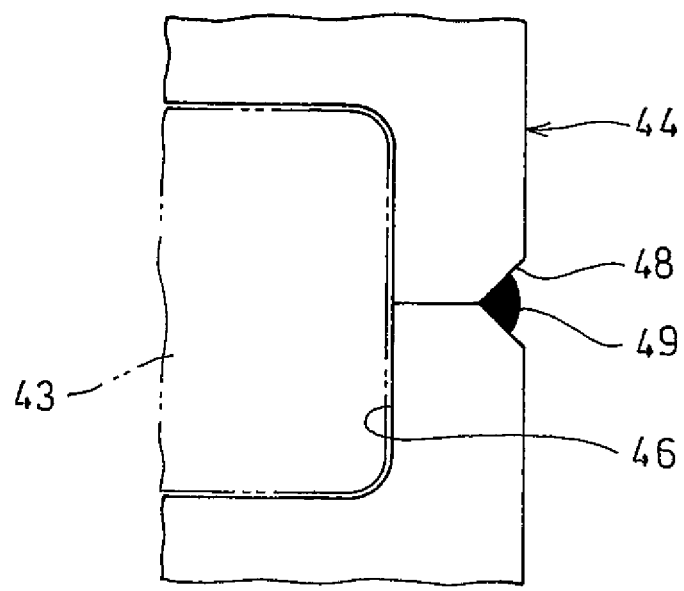
FIG. 21 is a plan view of a portion of a still different retainer formed by welding.

If the retainer 44 is formed by bending a strip of steel plate into a cylindrical shape and by joining together the abutment end surfaces of the cylindrically bent strip by welding, in order to prevent the bulge due to welding from protruding outwardly from the end surfaces of the retainer 44, the abutment end surfaces may be welded together at the radially outer surface of the retainer 44 as shown in FIGS. 18 and 19, at the radially inner surface of the retainer 44 as shown in FIG. 20, or both at the radially inner and outer surfaces of the retainer 44. Alternatively, as shown in FIG. 21, a V-shaped welding groove 48 may be formed in each end surface of the retainer 44 along the abutment end surfaces, and the abutment end surfaces may be welded together in the welding grooves 48. In FIGS. 18 to 21, numeral 49 indicates the welding portion.

DESCRIPTION OF THE NUMERALS

A₁, A₂. Chain guide
2. Driving sprocket
4. Driven sprocket
5. Timing chain (chain)
21. Guide base
22. Side plate
25. Shaft engaging portion
25a. Tapered groove section
25b. Shaft supporting section (Closed end portion)
26. Wall surface
27. Gap
31. Roller shaft
31a. End surface
31b. Radially outer surface
32. Curved surface portion
35. Window
41. Roller (roller bearing)
42. Outer race
43. Roller element
44. Retainer
44a. End surface
45. Inwardly extending flange
45a. Inner surface
50. Surface engaging portion
51a, 51b. Recessed or protruding surface
52a, 52b. Flat surface
53. Guide rib
54. Guide groove
55a, 55b. Flat surface
56. Window
57. Anti-separation protrusion
58. Guide surface

What is claimed is:

1. A chain guide comprising:
    a guide base including an opposed pair of side plates and elongated in one direction, wherein the guide base is configured to be arranged along a portion of an outer periphery of a timing chain such that said one direction coincides with a direction in which the timing chain moves, and wherein the side plates have shaft engaging portions;
    a plurality of roller shafts having ends supported by the respective shaft engaging portions and spaced apart from each other in a longitudinal direction of the side plates; and
    rollers rotatably supported by the respective roller shafts and configured to guide the timing chain,
    wherein the roller shafts have cylindrical surfaces, respectively, for rotatably supporting the rollers;
    wherein the shaft engaging portions have first surface engaging portions;
    wherein the roller shafts further have second surface engaging portions at respective ends of the roller shafts separated by the respective cylindrical surfaces thereof;
    wherein the second surface engaging portions of the roller shafts have non-cylindrical shapes that are complementary in shape with and engaged with the first surface engaging portions of the shaft engaging portions so as to rotationally fix the roller shafts between the opposed pair of side plates; and
    wherein the guide base and the roller shafts are made of different materials that have different coefficients of linear expansion.

2. The chain guide of claim 1, wherein each of the shaft engaging portions comprises a tapered groove section extending from a side surface of a corresponding side plate facing the timing chain in a width direction of the corresponding side plate, and a circular shaft supporting section connected to a narrow end of the tapered groove section and configured to support one end of one of the roller shafts, wherein the narrow end has a width smaller than outer diameters of the roller shafts and wherein the circular shaft supporting section includes the first surface engaging portions.

3. The chain guide of claim 2, wherein the first surface engaging portions are first recessed or protruding surfaces formed on inner peripheries of the respective shaft supporting sections, and wherein the second surface engaging portions are second recessed or protruding surfaces formed on outer peripheries of the ends of the roller shafts and configured to be brought into surface engagement with the respective first recessed or protruding surfaces.

4. The chain guide of claim 3, wherein two of the second recessed or protruding surfaces are formed on the outer periphery of each of the ends of the roller shafts so as to be diametrically opposed to each other and symmetrical to each other with respect to a plane including an axis of the roller shaft.

5. The chain guide of claim 2, wherein the first surface engaging portions are first flat surfaces formed on inner peripheries of the respective shaft supporting sections, and wherein the second surface engaging portions are second flat surfaces formed on outer peripheries of the ends of the roller shafts and configured to be brought into surface engagement with the respective first flat surfaces.

6. A chain guide comprising:
a guide base including an opposed pair of side plates and elongated in one direction, wherein the guide base is configured to be arranged along a portion of an outer periphery of a timing chain such that said one direction coincides with a direction in which the timing chain moves, and wherein the side plates have shaft engaging portions;
a plurality of roller shafts having ends supported by the respective shaft engaging portions and spaced apart from each other in a longitudinal direction of the side plates; and
rollers rotatably supported by the respective roller shafts and configured to guide the timing chain,
wherein the shaft engaging portions have first surface engaging portions, and the roller shafts have second surface engaging portions at the respective ends of the roller shafts which are in surface engagement with the respective first surface engaging portions, thereby rotationally fixing the roller shafts,
wherein each of the shaft engaging portions comprises a tapered groove section extending from a side surface of a corresponding side plate facing the timing chain in a width direction of the corresponding side plate, and a circular shaft supporting section connected to a narrow end of the tapered groove section and configured to support one end of one of the roller shafts, wherein the narrow end has a width smaller than outer diameters of the roller shafts; and
wherein radial load supporting surfaces are formed on inner peripheries of the respective shaft supporting sections, wherein the first surface engaging portions comprise guide ribs extending from the respective load supporting surfaces to openings of the respective shaft engaging portions, wherein the end surfaces of the roller shafts are circular in shape, wherein the second surface engaging portions comprise guide grooves formed in the respective end surfaces of the roller shafts to extend in diametrical directions of the end surfaces of the roller shafts, and wherein each of the guide ribs has two side surfaces and is fitted in a corresponding one of the guide grooves with the two side surfaces in surface engagement with inner side walls of the corresponding one of the guide grooves.

7. The chain guide of claim 2, wherein each of the first surface engaging portions comprises two mutually opposed first flat surfaces formed on an inner periphery of one of the shaft supporting sections, and wherein each of the second surface engaging portions comprises two mutually opposed second flat surfaces formed on an outer periphery of one of end portions of the roller shafts and kept in surface engagement with the corresponding two first flat surfaces.

8. The chain guide of claim 7, wherein, for each of the shaft engaging portions, the two mutually opposed first flat surfaces are spaced apart from each other by a same distance as the width of the narrow end of the tapered groove section, an elastically deformable anti-separation protrusion is formed on a portion of a wall surface of the shaft engaging portion where a corresponding one of the end surfaces of the roller shafts is opposed such that the anti-separation protrusion is brought into engagement with an upper portion of the outer periphery of the roller shaft, thereby preventing separation of the roller shaft, and wherein the anti-separation protrusion is formed with an inclined guide surface on an inner surface of the anti-separation protrusion which faces the roller shaft.

9. The chain guide of claim 1, wherein the guide base is formed of a synthetic resin, and the roller shafts are made of steel.

10. The chain guide of claim 9, wherein gaps are defined between respective end surfaces of the roller shafts and wall surfaces of the shaft engaging portions facing the respective end surfaces of the roller shafts.

11. The chain guide of claim 9, wherein each of the roller shafts has curved surface portions having a circular arc-shaped cross-section between an outer peripheral surface and respective end surfaces, of the roller shaft.

12. The chain guide of claim 9, wherein each of the shaft engaging portions has a window formed in a wall surface of the shaft engaging portion facing a corresponding one of end surfaces of the roller shafts, and wherein the window is smaller than the end surfaces of the roller shafts, and extends to an outer side surface of a corresponding one of the side plates.

13. A chain transmission device comprising a driving sprocket, a driven sprocket, a timing chain trained around the driving sprocket and the driven sprocket, a pivotable chain guide provided on one side of a slack side of the timing chain to guide a movement of the timing chain, wherein the chain guide is pivotable about one end of the chain guide, and a chain tensioner configured to apply an adjusting force to a remote end of the chain guide which is remote from the one end of the chain guide, thereby pressing the remote end against the timing chain,
wherein the pivotable chain guide is the chain guide of claim 1.

14. A chain transmission device comprising a driving sprocket, a driven sprocket, a timing chain trained around the driving sprocket and the driven sprocket, a pivotable chain guide provided on one side of a slack side of the timing chain to guide a movement of the timing chain, wherein the chain guide is pivotable about one end of the chain guide, a chain tensioner configured to apply an adjusting force to a remote end of the chain guide which is remote from the one end of the chain guide, thereby pressing the remote end against the timing chain, and a fixed chain guide fixed in position on one side of a tension side of the timing chain to guide the movement of the timing chain, wherein at least one of the pivotable chain guide and the fixed chain guide is the chain guide of claim 1.

* * * * *